United States Patent [19]

Kelly

[11] Patent Number: 4,649,901
[45] Date of Patent: Mar. 17, 1987

[54] SOLAR HEATING SYSTEM

[76] Inventor: Ronald J. Kelly, 2739 W. 72nd, Apt. 6, Davenport, Iowa 52806

[21] Appl. No.: 696,939

[22] Filed: Jan. 31, 1985

[51] Int. Cl.$^4$ .......................... E04D 13/18; F24J 2/40
[52] U.S. Cl. .................................... 126/429; 126/419; 126/449
[58] Field of Search ................ 126/419, 422, 429–432, 126/449, 450; 98/96, 88 R

[56] References Cited

U.S. PATENT DOCUMENTS

| 2,595,905 | 5/1952  | Telkes ............................ 126/419 |
| 3,875,925 | 4/1975  | Johnston ........................ 126/429 |
| 3,990,635 | 11/1976 | Restle et al. ................... 126/429 |
| 4,054,125 | 10/1977 | Eckels ........................... 126/429 |

FOREIGN PATENT DOCUMENTS 354916 7/1961 Switzerland ..................... 126/429

Primary Examiner—James C. Yeung
Attorney, Agent, or Firm—Glenn H. Antrim

[57] ABSTRACT

A passive solar heating system is disclosed which is used in conjunction with doors and windows exposed to solar radiation and having at least partially transparent glazing. Said system comprises a blind having rotatably adjustable slats disposed in a plane substantially parallel to a panel of glazing, a first absorptive screen for converting light energy into thermal energy. Said screen having a plane substantially parallel to that the glazing and a shade or curtain for selectively covering said system having a plane substantially parallel to the plane of the glazing. Adjustment of the blinds, screens and shade permits the desired degree of immergent light to be converted to heat. Alternatively, more than one absorptive screen may be added to increase the efficiency of thermal conversion.

3 Claims, 1 Drawing Figure

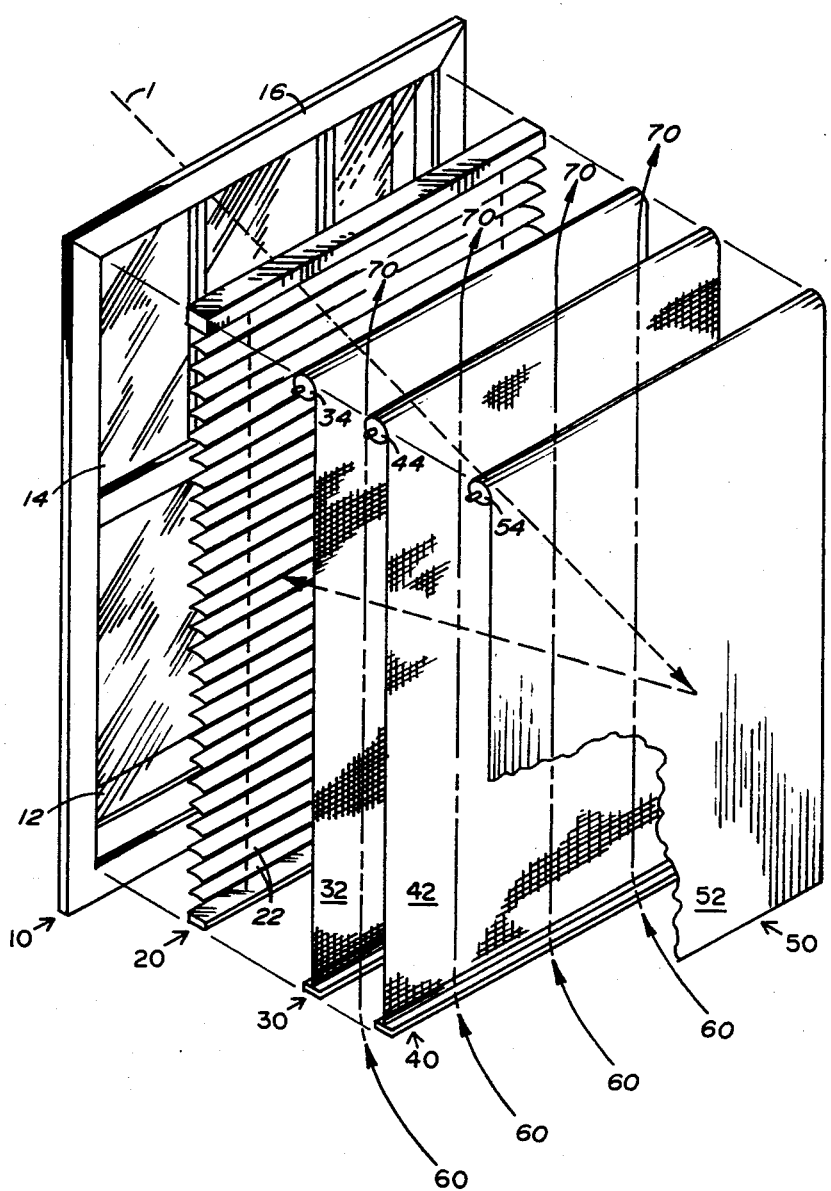

SOLAR HEATING SYSTEM

BACKGROUND OF THE INVENTION

1. Field of the Invention

The present invention pertains to a system for deriving useful heat energy from the solar radiation transmitted through window and door openings in buildings and other structures. Said openings have at least partially transparent glazing comprised of glass, plastic or other transmissive material.

Buildings and other structures having windows and doors directly exposed to sunlight create a problem for the occupants because the solar radiant energy entering through said windows and doors provides harsh lighting and radiant heating of objects within the building. Such lighting conditions have been proven to be not conducive to a desirable level of productivity of workers and students exposed thereto. Moreover, radiant heating of furniture, carpeting and other objects by direct solar radiation is not desirable as such exposure is destructive to various man-made and natural textiles and dyestuffs.

However, current economic conditions dictate that rather than simply reflecting the undesired light back through the windows and doors of a building exposed to direct sunlight, it is economically preferable to capture said radiant energy as it enters the building and convert it into useful thermal energy for the purpose of heating the interior of the structure.

Therefore, it is desirable to provide a system for collecting solar energy entering a building through its windows and doors and converting the solar energy to thermal energy for the purpose of space heating without exposing the interior occupants or contents to direct exposure of harsh and intense solar radiation. Moreover, it is desirable to provide means for selectively controlling the amount of radiation entering the room to affect a proper balance between available heat and light. It is also desirable to provide such a system for existing buildings and other structures without substantially modifying existing glazing or blinds.

2. Description of the Prior Art

One prior system for using solar energy for space heating is disclosed in U.S. Pat. No. 4,090,497 to Kelly. In this system, solar radiation strikes the parallel transparent sides of a closed chamber which contains a heat exchanger for transmitting heat converted from solar energy by radiation absorbing means such as the louvers of venetian blinds and the like.

The disadvantage of this type of system is that a complex mechanical arrangement must be provided for adjusting the angle of the louvers to maximally capture radiant solar energy. Moreover, an expensive chamber must be provided for the system to operate properly.

U.S. Pat. No. 4,459,975 to Hobart discloses a solar energy converter for use in a location adjacent to the inside of a window to receive solar energy and change it to useful heat. This invention utilizes curved adjustable blinds for the purpose of converting radiant energy into heat energy. Disadvantageously, the Hobart disclosure does not provide a means for excluding both heat and light. Consequently, if one were to close the blinds to exclude light transmitted into the structure, a concomitant rise in heat transmitted to the interior of the structure would occur. Likewise, adjusting the blinds to maximally admit light to the interior of the building would result in minimum heat conversion. There are no means for reducing both heat and light.

U.S. Pat. No. 4,379,449 to Wiggins et al. discloses a solar hot-air system consisting primarily of a glass, a screen, a collector and air chambers as well as two sheets of aluminum to trap and hold heat. Also included is an electric fan to extract heat from the collector while the sun is shining. This unit is not intended to be installed in a window or door or other opening in a structure where it is desirable to at least partially utilize solar radiation for lighting purposes.

SUMMARY OF THE INVENTION

The present invention provides a solar heating system in which the solar radiation collecting apparatus transmits a variable level of visible light striking it. This apparatus is ideal for incorporation into a window or door or other opening in a building or structure. This system comprises a panel exposed to solar radiation and at least partially transparent to said radiation, a shade for selectively covering said system disposed in the plane substantially parallel to said panel. The system additionally comprises a first absorptive screen disposed a plane between said panel and said shade having a plane substantially parallel to that of a panel and a blind having rotatable slats disposed in a plane between said panel and said first absorptive screen having a plane substantially parallel to said panel. Preferably, a second absorptive screen is disposed between said first absorptive screen and said shade in a plane substantially parallel to that of the panel. Alternatively, a plurality of absorptive screens may be added to the system depending upon the desired level of thermal conversion.

In the preferred embodiment, the first and second screens and shade can be selectively raised or lowered to effect a desired balance between light transmitted to the interior of the building and light converted to heat energy for warming the interior of the building In a second preferred embodiment, said first and second screens and shade are selectively drawn from side to side for the purpose of controlling the balance of heat and light transmitted to the interior of the structure.

It is thus a principal object of the present invention to provide an improved solar heating system. It is another object of the invention to provide a solar heating system in which the solar radiation collecting apparatus can be incorporated into window or door openings of building or other structure having at least partially transparent glazing.

Still another object of the invention is to provide solar heating apparatus which allows a selective balance between heat energy transmitted to the interior of the building and solar light so transmitted.

Other objects, features and advantages of the present invention will be made apparent by the following description of the preferred embodiments, the drawings and the claims.

BRIEF DESCRIPTION OF THE DRAWINGS

The drawing is a perspective view of the preferred embodiment generally illustrating the arrangement of the various elements of the solar heating system constructed according to the principles of the present invention.

DESCRIPTION OF THE PREFERRED EMBODIMENT

Referring now to the drawing, there is shown a solar heating system constructed according to the principles of the present invention comprising a window 10 typically found in a building or other structure having a frame 12 surrounding the outer perimeter of a panel 14 of glazing. Said glazing can be comprised of glass, plastic or other material which is at least partially transparent to solar light The window is fixed to the exterior of a building or other structure (not shown) by means well known to the art such that it is exposed, at least partially, to solar radiation shown here as a single ray 1.

A blind 20 having a plurality of parallel slats 22 is disposed in the plane substantially parallel to the plane of the panel 14 of glazing. The specific mechanism for rotating the slats 22 about their longitudinal axes is well known to the art and is not shown. It is also intended that said blind 20 have a means for the operator to raise and lower the blind in a manner consistent with conventional operation. In the lowered position (shown), the blind 20 substantially covers the glazed panel 14.

A first absorptive screen 30 is disposed in a plane substantially parallel to the plane of glazing 14. Said absorptive screen 30 is comprised of mesh 32 which is fabricated from suitable metal or plastic. In the preferred embodiment shown in the first screen 30 is fixed to the building in the vicinity of the top 16 of the window frame 12 preferably by spring loaded roller means 34 well known to the window shade art.

Said mesh 32 provides a surface characterized by high solar radiation absorptance. Typically, an ordinary wire mesh window screen is spray painted with flat black paint to provide an ideal absorptive surface. It has been found that mesh having fourteen to sixteen strands per inch is suitable for this application although mesh having a greater or lesser number of strands per inch can be selected depending upon the desired efficiency of the system in converting solar light to thermal energy.

Alternatively, a selective surface may be provided on the surface of the mesh 32. A selective surface is highly absorptive of solar light while providing a low emittance of thermal energy. A black painted surface, by contrast, provides a high solar light absorptance coupled with a high thermal emittance. In either case, it is desirable to provide a surface characterized by a high absorptivity for solar light energy and ability to efficiently convert said light to thermal energy. Additionally, it is desirable that the mesh provide a large surface area for efficient transfer of said converted thermal energy to adjacent air by conduction, convection and radiation.

A second absorptive screen 40 is disposed in a plane substantially parallel to that of the first absorptive screen 30. Said second screen 40 is comprised of mesh 42 which is attached to the building or structure by means of a spring loaded roller 44. Ideally, said mesh 42 is physically and functionally identical to that previously described for the mesh 32 of the first screen 30. However, the mesh 32 and 42 of the first and second screens 30 and 40, respectively, may have differing absorptivities and mesh sizing as a particular application may require.

An ordinary window shade 50, having a plane substantially parallel to that of the panel 14 of glazing, is suspended from the building in the vicinity of the top 16 of the window 10 by means of a spring loaded roller 54. Said shade 50 is well known to the art and may be comprised of cloth or plastic 52 having a selected degree of opacity.

Distances between the various elements (panel 10, blind 20, first screen 30, second screen 40, and shade 50) of the system can be selected to accommodate a wide range of window arrangements, but must be sufficient to permit adequate airflow between the elements.

If solar light energy 1 enters the building through the panel 14 of glazing, it is allowed to pass through the slats 22 of the blind 20. The total amount of admitted light is controlled by rotation of the slats 22. Said light then strikes the absorptive mesh 32 of the first screen 30 where a portion is absorbed and converted to thermal energy. The balance of the solar light energy not scattered or absorbed by the window 10, blind 20 or first screen 30, then strikes the absorptive mesh 42 of the second screen 40 and the level of solar light is further reduced and additional thermal energy is converted.

The balance of light emitted from the second screen 40 then strikes the shade 50. Depending upon the selected opacity of the shade, some or all of the light striking it is reflected back to the mesh 42 of the second screen 40 where an additional fraction of solar light is absorbed and converted to thermal energy. The remainder of the light, which is not so absorbed, is transmitted to the mesh 42 of the first screen 30 for further conversion of thermal energy. The balance of the light not converted by the aforementioned process is allowed to pass through the panel 14 of glazing to the exterior of the building or structure.

An additional advantage of the instant system is reduction of conductive, convective and radiant loss of heat from a building during overcast or dark conditions.

Where the absorptive coefficient of the first and second screens is 40%, which is a typical value for black painted window screen, the light reflected out of the building is theoretically no more than 4% of that entering the building. Thus, the present invention provides a system for efficiently capturing and converting the predominant majority of solar radiant energy entering a building or structure through its glazed windows and doors while selectively permitting very little unconverted light to directly enter the interior space of the room.

The apparatus described herein operates by heating cooler air 60 contained within the interior of the structure or building. Said air 60 comes in contact with the warm absorptive mesh 32 and 42 of the first and second screens 30 and 40, respectively. Said mesh is warmed by the conversion of solar energy to thermal energy. The cool air 60 which contacts the screens 30 and 40 is warmed by radiation from the absorptive mesh 32 and 34 of the screens 30 and 40. It is also heated by convection of warmer air surrounding said screens. As the cooler room air 60 is warmed, it rises resulting in relatively warmer air 70 exiting at the top of the apparatus. This process results in overall warming of the interior space of the room due to the convective process of the system. Experimentation has shown that the ideal member of absorptive screens is two. This arrangement provides optimum conditions for proper upward convection of cooler room air.

The blind 20 can be utilized to regulate the total amount of light available for thermal conversion and for lighting the interior of the room. This can be accomplished by merely rotating the slats 22 about their longitudinal axis. The shade 50 can also be operated to adjust the balance between light and heat transmitted to the interior of the room. When the shade is raised, very little of the solar energy transmitted through the second screen 40 is reflected back for further absorption by the system. Thus, more light is available for lighting the interior of the room and the system is less efficient in converting said solar light to heat when the shade 50 is raised.

Alternatively, when the shade 50 is drawn, there is less light transmitted to the room and more reflected back through the second and first screens 40 and 30, respectively. Because the opacity of the shade can be selected to fall within a wide range, a preselected balance can be established by proper selection of the opacity of the shade 52. Where the shade is highly reflective to solar radiation, the thermal conversion properties of the system are maximized because very little light passes beyond the system and most is converted to thermal energy. On the other hand, where the shade 50 is highly transparent, more light may be made available to the room with a concomitant reduction in the thermal conversion efficiency of the system.

While the blind 20 controls the overall light available for thermal conversion or transmission into the building, and while the position of the shade 50 and its selection of opacity controls the amount of unconverted light available to the interior of the structure, the first and second absorptive screens 30 and 40, respectively, can be utilized to control the ratio of thermal conversion of the system. In the preferred embodiment shown in the drawing, each screen can be selectively raised or lowered. With both screens lowered to completely cover the panel 14 of glazing, the system maximally converts solar light energy to sensible thermal energy. As the screens are raised, less absorptive surfaces is made available and thus the system converts a concomitantly lower amount of light to heat. It is anticipated that numerous modifications and alternative embodiments, may be made without departing from the spirit of the invention. For example, the solar heating apparatus may be incorporated in the skylight or roof of the structure rather than in a vertical window or door unit.

Additionally, a single mesh absorptive screen may be utilized in lieu of first and second screens. This arrangement would provide a space saving alternative but would be less efficient than utilizing both first and second absorptive mesh screens.

Moreover, the absorptive screens and shade may be affixed to the building in the vicinity of the window or door by means of side pull curtain rods or the like. This arrangement would obviate the necessity for spring loaded rollers while allowing for continuous adjustment of the balance between the amount of solar light admitted to the interior of the building and that amount converted to thermal energy for heating the interior of the building. An electric fan or other powered mechanical means can be utilized to assist air flow through the system to augment natural flow by convection. Finally a textile or plastic curtain or the drapery may be substituted for the shade.

It is thus intended that the scope of the invention may be limited only by the claims which follow.

I claim:

1. A solar heating system for an opening of a building comprising:
    a frame to fit tightly within said opening,
    an outer panel glazed within said frame, said outer panel being at least partially transparent to solar radiation,
    absorptive screen material spaced opposite the inner surface of said outer panel,
    an adjustable blind disposed between said outer panel and said absorptive screen material, spacing between said outer panel and the outer surface of said absorptive screen material being sufficient to permit adjustment of said blind for transmitting different amounts of said solar radiation both to and through said absorptive screen material,
    an inner shade disposed over the inner surface of said absorptive screen material, said inner shade having a desired degree of translucence for transmitting therethrough a desired portion of light derived from said solar radiation transmitted through said absorptive screen, and
    both said inner and outer surfaces of said absorptive screen being highly absorptive, the outer surface of said inner shade being a good reflector and facing said inner surface of said absorptive screen material, said outer surface of said inner shade reflecting a substantial portion of said solar radiation to said inner surface of said absorptive screen material for conversion thereby to heat.

2. A solar heating system as claimed in claim 1 wherein separate means are connected to said absorptive screen material and to said inner shade for independently permitting said absorptive screen material and said inner shade to be moved in the respective planes thereof from positions opposite said outer panel to any desired position of selected amount of overlap relative to said outer panel, the independent ajdustment of said adjustable blind and positioning of said absorptive screen material permitting in different degrees and in different proportions the amounts of heat and light transmitted through said solar heating system into the interior of said building.

3. A solar heating system for an opening of a building comprising:
    a frame to fit tightly within said opening,
    an outer panel glazed within said frame, said outer panel being at least partially transparent to solar radiation impinging thereon,
    a blind having rotatable slats disposed adjacent substantially the entire inner surface of said panel,
    an absorptive screen disposed in a respective most effective position opposite substantially the entire inner surface of said blind for coverting part of said impinging solar radiation into heat and transmitting therethrough part of the impinging solar radiation as light,
    an inner shade disposed in a respective most effective position opposite substantially the entire inner surface of said absorptive screen, said inner shade having a degree of translucence for transmitting a desired portion of light impinging thereon,
    means for rotating said slats to regulate the portion of said impinging solar radiation transmitted therethrough, the rotation of said slats regulating both the amount of heat to be derived from said absorptive screen and the amount of light transmitted to and through said inner shade, and
    separate means connected to said absorptive screen and to said inner shade for permitting said screen and said inner shade to be moved independently in the respective planes thereof from said respective most effective positions to any desired less effective positions having respective selected amounts of overlap relative to said outer panel, the independent rotation of said slats and positioning of said absorptive screen and of said inner shade permitting in different degrees and in different proportions the amounts of heat and light transmitted through said solar heating system to the interior of said building.

* * * * *